Jan. 3, 1950

E. R. WILLIAMS 2,493,095

OIL AND GAS SEPARATOR

Filed July 25, 1946

ELMER R. WILLIAMS
*INVENTOR.*

BY

*ATTORNEY*

ELMER R. WILLIAMS
*INVENTOR.*

BY

ATTORNEY

Patented Jan. 3, 1950

2,493,095

UNITED STATES PATENT OFFICE 2,493,095

OIL AND GAS SEPARATOR

Elmer R. Williams, Tulsa, Okla.

Application July 25, 1946, Serial No. 686,107

5 Claims. (Cl. 183—2.7)

This invention relates to an oil and gas separator.

A principal object of this invention is to provide an improved form of oil and gas separator for effecting efficient separation of oil and gas either under low or high pressure and under the varying volume-pressure conditions normally occurring in connection with the discharge of a mixed stream of oil and gas from a well.

Another object is to provide an improved form of oil and gas separator in which the oil and gas are removed from the same compartment after their separation.

A further object is the provision of an oil and gas separator in which a main separator vessel, having a mist extractor in the upper portion thereof, is provided with an auxiliary separator compartment which connects the gas outlet of the mist extractor and the oil reservoir in the main separator, whereby pressures on the separated oil and gas may be equalized in the auxiliary compartment to effect more efficient separation.

Other and more specific objects and advantages of this invention will be undertsood in the following detailed description when read in conjunction with the accompanying drawings which illustrate useful embodiments in accordance with this invention.

Figure 1:
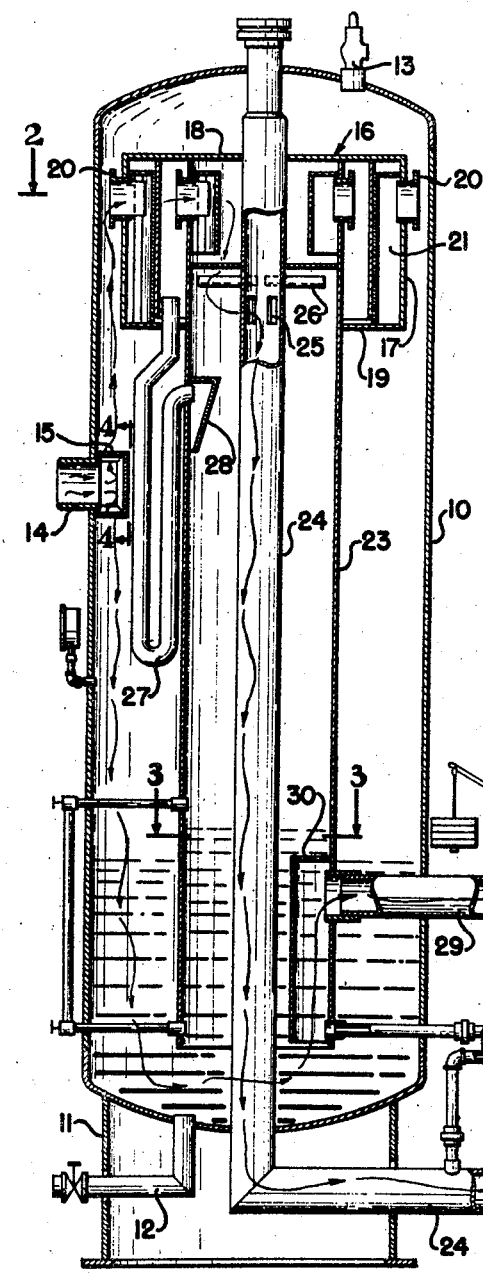
Fig. 1 is a longitudinal, sectional elevation of an apparatus in accordance with this invention.

Referring to the drawings, the numeral 10 designates an upright cylindrical tank mounted on a support skirt 11. The bottom of tank 10 is provided with a drain pipe 12 and a pressure relief valve 13 is connected into the top of the tank. An oil and gas inlet 14 is connected into the side of tank 10 at a point intermediate the ends thereof and discharges interiorly of the tank through a hood 15 of a suitable form, so as to direct the entering fluid tangentially along the inner surface of the tank. A mist extractor, designated generally by the numeral 16, comprises a cylindrical shell 17 arranged concentrically in the upper portion of tank 10 and provided with a top 18 and a bottom 19. Shell 17 is provided with a plurality of angularly spaced gas inlet ports 20 communicating with a conventional series of interconnected annular channels 21, suitably baffled, to force the entering gas to travel a tortuous path through the mist extractor from inlets 20 to the gas outlet, which consists of a plurality of radially extending slots 22, cut through the center portion of bottom 19. Welded to bottom 19 and enclosing slots 22 is an enlarged cylindrical tube 23, hereinafter referred to as auxiliary separator 23, which extends longitudinally through tank 10 from its point of connection to mist extractor 16 to a point adjacent the bottom of tank 10. The lower end of the auxiliary separator 23 is open, thereby communicating with the interior of tank 10. A gas discharge pipe 24 extends axially through the entire length of tank 10 passing through the mist extractor 16 and auxiliary separator 23 and emerging from tank 10 through the bottom thereof. The upper end of gas discharge pipe 24 is closed and the exterior of the portion thereof which passes through mist extractor 16 is welded to the top and bottom 18 and 19 of the mist extractor, so that there is no direct communication between the interior of pipe 24 and the interior of the mist extractor. A series of openings 25 are cut into discharge pipe 24 at a point below bottom 19 of the mist extractor so that gas discharging from the mist extractor through slots 22 will, after first entering auxiliary separator 23, flow through openings 25 into gas discharge pipe 24 and thence out of the auxiliary separator 23. Radial baffles 26 are interposed in the annular space between discharge pipe 24 and the wall of auxiliary separator 23 in the path of gas flowing from slots 22 to slots 25. These baffles 26 may be conveniently in the form of upturned channel sections, as shown, or of any other suitable form to knock out the last traces of liquid from the gas leaving the mist extractor. A drain pipe 27, in the form of a U-tube, connects the lower portion of mist extractor 16, outside the discharge area connected to auxiliary separator 23, with the interior of the auxiliary separator. One arm of U-shaped pipe 27 connects into the bottom of mist extractor 16 and extends a short distance therein above the bottom of one of the channels 21, thereby forming an overflow dam for maintaining a liquid level in the bottom of the mist extractor. The other end of pipe 27, which connects into auxiliary separator 23, discharges therein through a nozzle 28, which is arranged to direct any liquid thus delivered into auxiliary separator 23 downwardly along the inner surface thereof. A liquid discharge pipe 29 communicates at one end with the interior of auxiliary separator 23 near the lower end thereof and extend through tank 10 to the exterior thereof. A semi-circular hood 30 is mounted over the end of outlet pipe 29 inside separator 23, being closed at the top and sides and open only at the bottom adjacent the lower end of auxiliary separator 23. Outlet pipes 24 and 29 are controlled by outlet valves 31 and 32, respectively. These valves may be of any suitable or conventional form for controlling the rate of discharge of the gas and oil from the separator and may be automatically controlled or manually operated in any conventional manner, as desired, such forms of control valves being well-known in this art. Oil outlet control valve 32 is operated in any conventional manner to maintain a level of liquid in tank 10 well above the lower end of auxiliary separator 23, so as to maintain a liquid seal between tank 10 and auxiliary separator 23.

As illustrated in the drawings, these outlet valves are parts of a duplex control valve, designated generally by the numeral 34, which is of a form described in my co-pending application Serial No. 663,130, filed April 18, 1946, this being a convenient form for use with the separator herein described, but is not essential to its operation and of itself forms no part of this particular invention.

Figure 2:
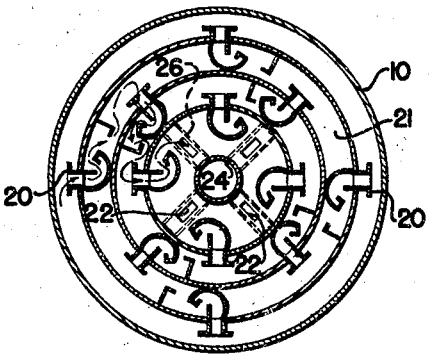
Fig. 2 is a cross-sectional view taken along line 2—2 of Fig. 1.
Figure 3:
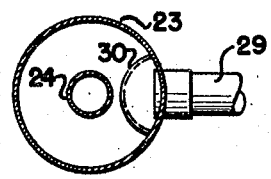
Fig. 3 is a cross-sectional view taken along line 3—3 of Fig. 1.
Figure 4:
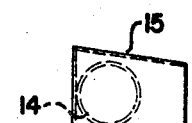
Fig. 4 is a view taken along line 4—4 of Fig. 1.

The apparatus above described, operates in the following manner: Oil and gas from a well enters inlet 14 and is discharged through hood 15 tangentially into tank 10. The entering mixture is thereby initially separated into oil and gas. The oil flows to the lower end of tank 10 through the annular space between the tank and auxiliary separator 23 and collects therein in a pool, the level of which is maintained by suitable control of valve 32 above the level of outlet pipe 29. The level of oil thus maintained will be sufficient, therefore, to submerge the open lower end of auxiliary separator 23 and thereby provide a liquid seal between tank 10 and auxiliary separator 23. The gas initially separated in this manner, and containing some oil in suspension therein, flows upwardly in the tank and enters the inlet nozzles 20 of the mist extractor, wherein the gas travels in a more or less tortuous path, as indicated by the arrows in Figs. 1 and 2 particularly, and passes out of the mist extractor through slots 22 into the interior of auxiliary separator 23, where, after contacting baffles 26, the gas flows through slots 25 into outlet pipe 24 and thence through valve 31 to the desired point of disposal (not shown).

Oil entrained in the gas will be knocked out and trapped within the mist extractor and will collect on bottom plate 19 thereof within channels 21, where it will overflow through the upper end of pipe 27 and will be discharged thereby into the interior of auxiliary separator 23, wherein it will join the pool of oil which has collected in the lower portion of tank 10 and in the lower portion of auxiliary separator 23.

Final traces of oil entrained in the gas entering auxiliary separator 23 through slots 22, will be knocked out of the gas by baffles 26, the oil collecting thereon spilling over the ends of the baffles and falling to the pool in the lower end of auxiliary separator 23.

The oil collecting in the lower portion of auxiliary separator 23 will flow therefrom through outlet pipe 29 under control of valve 32 to storage (not shown) or other disposal means.

Water and dirt collecting in the bottom of tank 10 will be drawn off therefrom through drain pipe 12, either continuously or intermittently in accordance with conventional practice.

With the above-described arrangement, it will be seen that final separation of oil and gas takes place in auxiliary separator 23, from which both fluids are removed and that auxiliary separator 23 acts as a pressure equalizing means for continuously equalizing the pressure between the oil and gas inlets and outlets, regardless of the variations in relative proportions of oil and gas in the stream entering tank 10 and the consequent variation in the differential pressure across the mist extractor. Furthermore, the discharge of trapped oil from the mist extractor through the liquid sealed pipe 27 into auxiliary separator 23 above the level of liquid therein, effectively eliminates priming of oil through the mist extractor under conditions of high volume gas flow through the mist extractor, since, with the arrangement described, there is necessarily some pressure drop under all conditions between the inlet and outlet ends of pipe 27, which would prevent any reverse flow of oil through pipe 27.

Figure 5:
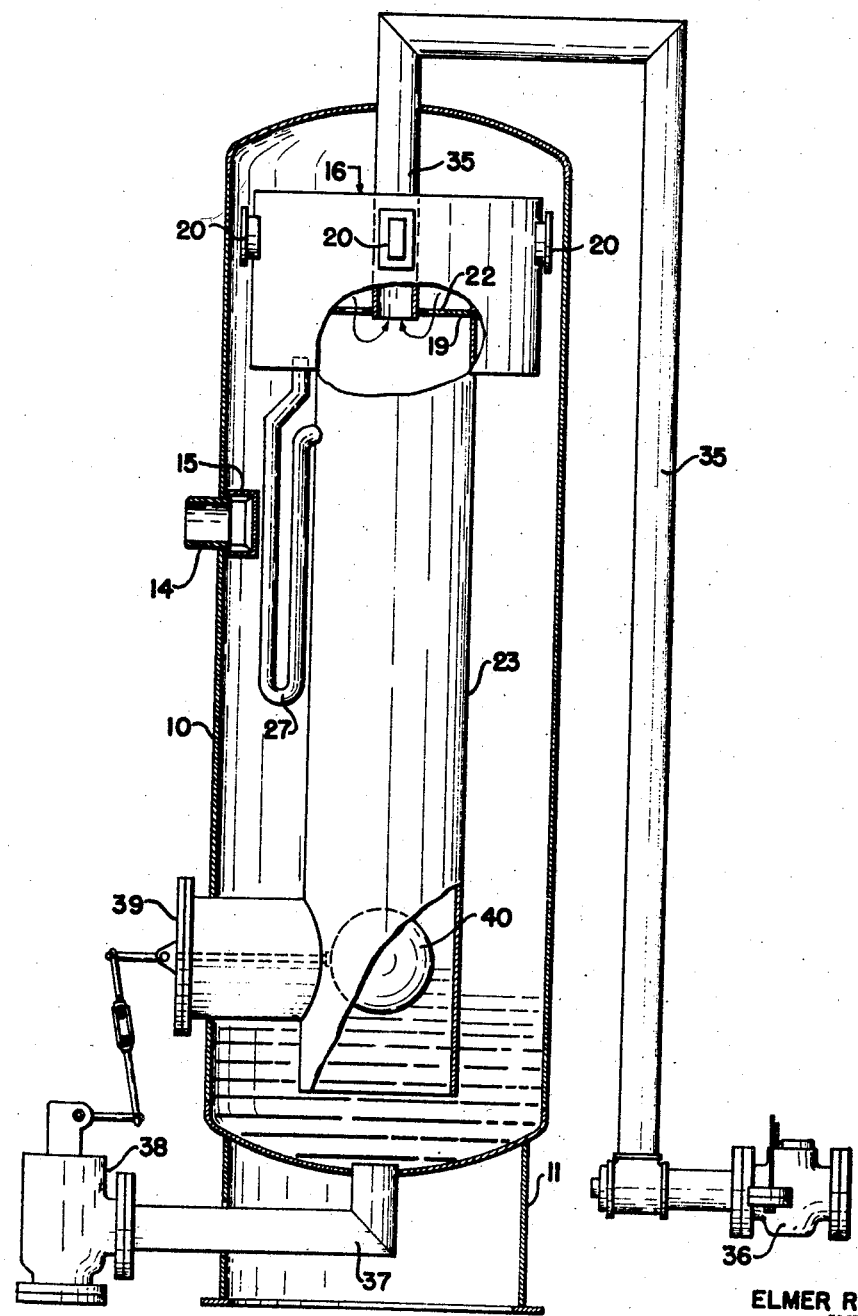
Fig. 5 is an elevational view partly in section, of another embodiment in accordance with this invention.

Fig. 5 illustrates another embodiment in accordance with this invention, in which those parts which are generally identical in form and arrangement with those of Figs. 1 to 4, inclusive, are designated by the same numerals. In this embodiment, a gas outlet pipe 35 extends through the top of tank 10 and through mist extractor 16 into communication with the interior of auxiliary separator 23. The discharge end of pipe 35 is provided with a conventional weight-loaded gas control valve 36. An oil outlet pipe 37, fitted with a control valve 38, connects into the bottom of tank 10. Valve 38 is under the control of a liquid level controller 39 having a float 40 arranged to be operated by the level of liquid in the interior of auxiliary separator 23.

In this embodiment, the gas, after leaving mist extractor 16 through discharge slots 22 and entering auxiliary separator 23, reverses its direction and leaves auxiliary separator 23 through the open end of gas outlet pipe 35 through which it leaves the system under control of valve 36. The separated oil is withdrawn through pipe 37 from the pool in the bottom of tank 10. The rate of withdrawal of oil is controlled, however, by the level maintained in auxiliary separator 23, which serves, as in the previous embodiment, to allow pressure equalization between the inlet and outlets of the separator.

It will be understood that numerous changes may be made in the details of the apparatus herein described. For example, the dimensions of auxiliary separator 23 throughout its length may be non-uniform, rather than uniform as shown, provided only that it is of sufficient capacity to equalize the pressure between the oil and gas inlets and outlets.

What I claim and desire to secure by Letters Patent is:

1. An oil and gas separator comprising, an upright tank having an oil and gas inlet thereto intermediate the ends thereof, a mist extractor in the upper portion thereof and means for maintaining a pool of oil in the lower portion thereof, said mist extractor having spaced gas inlet and outlet passageways, a conduit having one end connected to said outlet passageway and the other end open to and immersed in said pool of oil, an oil drain connection between said mist extractor and said conduit, and means for separately discharging oil from said pool and gas from said conduit.

2. An oil and gas separator comprising, an upright tank having an oil and gas inlet thereto intermediate the ends thereof, a mist extractor in the upper portion thereof and means for maintaining a pool of oil in the lower portion thereof, said mist extractor having spaced gas inlet and outlet passageways, a conduit having one end connected to said outlet passageway and the other end open to and immersed in said pool of oil, an oil drain connection between said mist extractor and said conduit, and means for separately discharging oil and gas from spaced points in said conduit to the exterior of said tank.

3. An oil and gas separator comprising, an upright tank having an oil and gas inlet thereto intermediate the ends thereof, a tubular conduit concentrically disposed within said tank and having its lower end in open communication with the interior of said tank adjacent the bottom thereof, means for maintaining a pool of liquid in the lower portion of said tank to form a liquid seal between said conduit and said tank, a mist extractor disposed in the upper portion of said tank having a gas inlet passageway communicating with the interior of said tank and a gas outlet passageway communicating with said conduit, an oil drain connection between said mist extractor and said conduit, and means for separately discharging oil and gas from spaced points in said conduit to the exterior of said tank.

4. An oil and gas separator comprising, an upright tank having an oil and gas inlet thereto intermediate the ends thereof, a mist extractor in the upper portion thereof and means for maintaining a pool of oil in the lower portion thereof, said mist extractor having spaced gas inlet and outlet passageways, a conduit having one end connected to said gas outlet passageway and the other end open to and immersed in said pool of oil, a liquid sealed oil drain pipe leading from a point in said mist extractor intermediate said gas inlet and outlet passageways to the interior of said conduit, and means for separately discharging oil and gas from spaced points in said conduit to the exterior of said tank.

5. An oil and gas separator comprising, an upright tank having an oil and gas inlet thereto intermediate its ends, a mist extractor in the upper portion thereof and means for maintaining a pool of oil in the lower portion thereof, said mist extractor having spaced gas inlet and outlet passageways, a conduit having one end connected to said outlet passageway and the other end open to and immersed in said pool of oil, an oil drain connection between said mist extractor and said conduit, and means for separately discharging oil and gas from spaced points in said conduit to the exterior of said tank, said oil discharge means including liquid level control means responsive to the change in level of oil within said conduit for regulating the discharge of oil from said pool.

ELMER R. WILLIAMS.

REFERENCES CITED

The following references are of record in the file of this patent:

UNITED STATES PATENTS

| Number | Name | Date |
| --- | --- | --- |
| 1,724,537 | Waters | Aug. 13, 1929 |
| 1,923,599 | Walker | Aug. 22, 1933 |
| 2,057,257 | Walker | Oct. 13, 1936 |
| 2,288,245 | Kopp | June 30, 1942 |